United States Patent [19]

Gregory et al.

[11] Patent Number: 4,789,913

[45] Date of Patent: Dec. 6, 1988

[54] METHOD AND APPARATUS FOR LUBRICATING A MAGNETIC DISK CONTINUOUSLY IN A RECORDING FILE

[75] Inventors: Thomas A. Gregory; Christopher G. Keller; Bruce E. Kennedy; Bruce A. Murray; Wayne J. Rothschild, all of Rochester, Minn.

[73] Assignee: International Business Machines Corporation, Armonk, N.Y.

[21] Appl. No.: 81,271

[22] Filed: Aug. 3, 1987

[51] Int. Cl.$^4$ ............... G11B 5/40; G11B 5/60; G11B 17/32; G11B 17/02

[52] U.S. Cl. ............... 360/97.03; 360/69; 360/71; 360/97.02; 428/695

[58] Field of Search ............... 360/69, 71, 97-99, 360/137

[56] References Cited

U.S. PATENT DOCUMENTS 4,626,941 12/1986 Sawada et al. ............... 360/98

Primary Examiner—Robert S. Tupper
Attorney, Agent, or Firm—Robert W. Lahtinen

[57] ABSTRACT

In a magnetic disk file having a plurality of disks and a source of organic lubricant mounted within a housing, an air flow stream recirculates within the housing. The vapor pressure of the lubricant source is controlled to provide vapor phase transport of lubricant molecules between the source and the disks' recording surfaces. The lubricant molecules bidirectionally transfer between the air stream and the source, and between the air stream and the surface of the disks, as is needed to maintain a mono-molecular lubricant film, in the range of about 3 to 15 angstroms, on the disks in accordance with the principle of Langmuir kinetics. The disks are rigid disks and their recording surface includes a carbon overcoat. This overcoat has an affinity for the airborne organic lubricant molecules.

In a first embodiment, the vapor pressure of the lubricant is controlled by mounting the material at the coolest location within the housing.

In a second embodiment, the lubricant is carried as a mono-molecular layer of lubricant on granular carbon particles which have a surface area that is many times greater than the surface area of the disks.

In a third embodiment, the vapor pressure is controlled by combining the lubricant with a vapor pressure diluent.

39 Claims, 8 Drawing Sheets 4,789,913

METHOD AND APPARATUS FOR LUBRICATING A MAGNETIC DISK CONTINUOUSLY IN A RECORDING FILE

DESCRIPTION

FIELD OF THE INVENTION

This invention relates to the field of magnetic data recording, and more specifically to magnetic recording by the use of a disk file. This invention is concerned with maintaining a mono-molecular layer or film of an organic lubricant on the recording surface of rigid magnetic recording disks, wherein the disks' recording surfaces include an amorphous carbon overcoat layer.

BACKGROUND OF THE INVENTION

The background of the present invention comprises the art of rigid disk files, the art of magnetic recording media lubrication, and the art of thin film magnetic recording media.

In the art of rigid disk files it is known that one or more disks are supported for rotation on a motor-driven spindle. These disks cooperate with a movable read-/write magnetic head assembly. The heads of this assembly fly close to the disks' recording surface, usually no more than 15 microinches above the disk surface. It is preferred that the disk file includes a sealed, or a substantially sealed external housing or container. U.S. Pat. No. 4,556,969 is an example of a disk file having a sealed container.

It is known that high speed rotation of the above mentioned motor-driven spindle creates a low pressure zone within the disk file enclosure. When the enclosure is not sealed, this low pressure zone can be used to induce the flow of filtered air into, through, and out of the enclosure. U.S. Pat. No. 4,471,395 is exemplary and is incorporated herein by reference.

It is known that the disk recording surface should preferable include a film of lubricant. In the art of magnetic media lubrication, it is known that saturated fatty acids, such as palmitic acid and stearic acid, are preferred lubricants. U.S. Pat. Nos. 4,526,833 and 4,539,266 are examples.

U.S. Pat. No. 4,626,941 describes a sealed disk file wherein the disks' recording surfaces are lubricated. The teaching of this patent deals with suppressing evaporation of the lubricant. This patent locates a lubricant source and a number of lubricated disks inside an airtight enclosure. The lubricant source is exposed to the flow of hot air that is produced by rotation of the disks. As a result, the enclosure is filled with lubricant vapors. This environment of vapor-rich air suppresses evaporation of lubricant from the surface of the disks.

The construction and arrangement of this patent suppresses evaporation of the disks' lubricant film by "filling up" the inside space of the air-tight enclosure with lubricant vapor. The patent specifically teaches that the temperature of the lubricant source should be "as high as possible" and that the selected lubricant should have the "highest evaporation rate". This produces a vapor-rich environment for the disks. Because of this vapor-rich environment, the lubricant film thickness is inherently thick, as compared to the thin 3 to 15 angstrom film of the present invention. Specific examples "as small as 100 angstroms" and 70 angstroms are described in the referenced patent.

As will be apparent, the teachings of the present invention utilize Langmuir kinetics to maintain a thin mono-molecular organic lubricant layer or film on magnetic recording media in the form of disks. These disks include a recording surface having an affinity for organic molecules.

The present invention requires that the construction and arrangement of U.S. Pat. No. 4,626,941 be avoided. More specifically, the present invention teaches that in order to maintain a mono-molecular lubricant film on the disks, bulk transfer of lubricant to the disks, as by distillative or sublimative transfer of lubricant molecules, must be prevented.

As will be appreciated by those of skill in the art, the thickness of the lubricant film in the referenced patent is in the range of at least 70 to 100 angstroms, which provides a layer on top of the recording layer that is an appreciable percentage of the surface roughness of thin-film magnetic disks. The present invention establishes a lubricant film in the range of only 3 to 15 angstroms. This much thinner lubricant layer is a smaller percentage of the disk's surface roughness. As is well known, excessive lubricant (or any organic material) can dramatically increase the coefficient of friction between the heads and magnetic disks, which if too severe will cause the file to become stuck.

In the art of thin film magnetic recording disks, it is known that a sputtered carbon film or overcoat layer, on the disk's recording surface, improves the mechanical durability of the head-to-disk interface. It is also known that this interface is preferably lubricated. U.S. Pat. No. 4,529,651 is an example of a means for forming a protective coating on a magnetic recording layer by means of a sputtering technique.

It is known that the vapor pressure of a material, such as a lubricant, is a function of the material's molecular structure and of the material's temperature. Generally, solids have a lower vapor pressure than do liquids. The vapor pressure of solids varies greatly, depending upon the material.

The vapor pressure of palmitic acid and stearic acid, exemplary lubricants usable in the present invention, are both considerably less than one atmosphere. More specifically, the temperature at which the vapor pressure of palmitic acid is 1 mm of mercury is about 153.6° centigrade, and the temperature at which the vapor pressure of stearic acid is 1 mm of mercury is about 173.7° centigrade.

SUMMARY OF THE INVENTION

Figure 1:
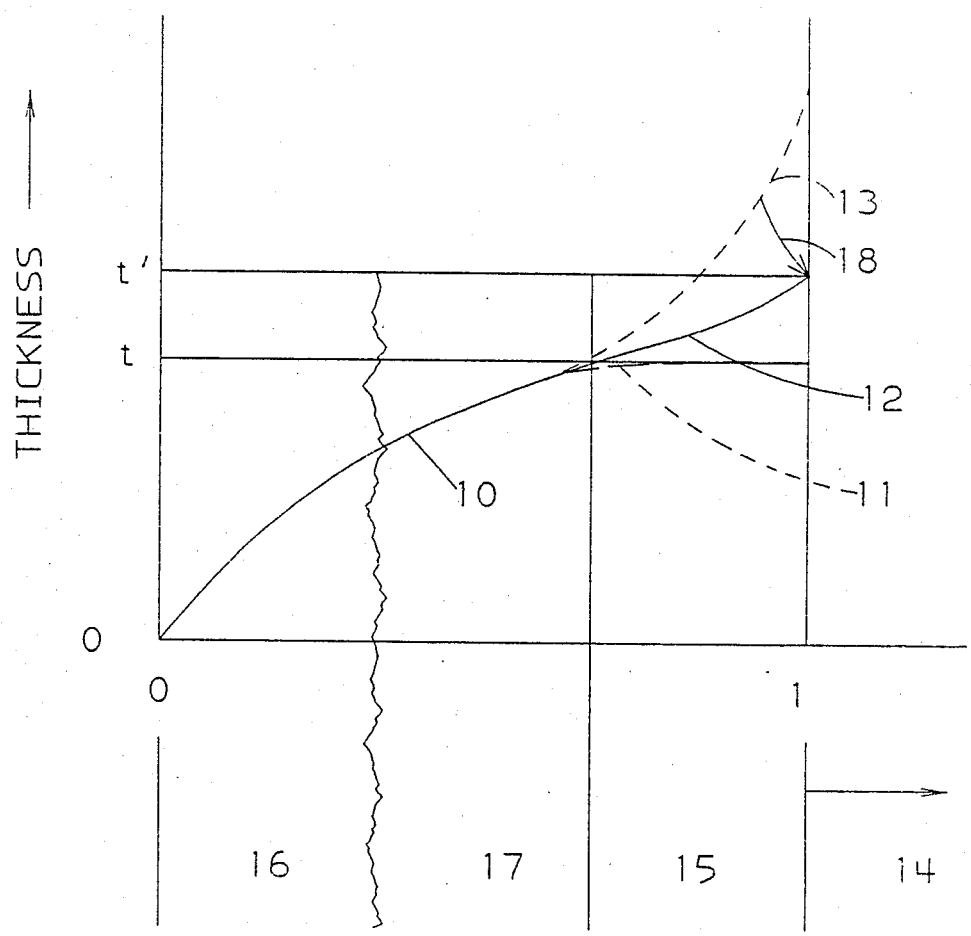
FIG. 1 is a graph showing Langmuir isotherms for stearic acid at ambient atmospheric pressure. This figure is used to explain the operation of the invention.

The present invention utilizes a controlled vapor pressure environment that communicates with magnetic media such as disks, to continuously maintain a mono-molecular organic lubricant layer on the surface of the disks. More specifically, the mono-molecular lubricant layer is in the range of about 3 to 15 angstroms thick.

A critical feature of the present invention is that the recording layer must have a propensity to surface-adsorb organic molecule. In a preferred embodiment, this propensity to adsorb organic molecules is provided by a carbon overcoat layer, for example amorphous carbon. A typical thickness for this carbon overcoat layer is in the range of about 150 to 350 angstroms.

The present invention makes use of the ability of the lubricant to vaporize. The airborne lubricant molecules deposit on the disk's overcoat layer, as needed, to provide a substantially continuous, mono-molecular layer of lubricant on the disk's recording surface.

Preferred organic lubricants for use in the present invention are: (1) the aliphatic carboxylic acids, of which palmitic acid and stearic acid are examples; (2) the aliphatic alcohols, of which stearal alcohol or 1-docosanol are examples; (3) the volatile perfluoropolyether compounds, which can include having certain specific functional end-groups are additional examples. Most of these materials generally exist as a solid at room temperature, but slowly pass to a vapor due to their inherent vapor pressure (i.e. the pressure that is exerted when a substance is in equilibrium with its own vapor). The liquids behave identically in this regard in that they also exhibit a specific and useful vapor pressure.

When constructing a disk file in accordance with the present invention, the disks are manufactured with a mono-molecular lubricant layer in the range of about 3 to 15 angstroms thick. When the disks contain a carbon overcoat, adsorption of the organic lubricant by this overcoat inherently results due to the high surface energy of the carbon layer.

This lubricant adsorption process, or more specifically the process by which a carbon overcoat layer adsorbs an organic material, is characterized by the theory of Langmuir kinetics. Therefore, mono-molecular coverage of the carbon layer by organic lubricant material is determined by the temperature of the carbon layer, the vapor pressure of the organic material being adsorbed, and the bond strength that exists between the carbon layer and the organic molecules residing on the carbon layer. This adsorption process, described by Langmuir kinetics is reversible since the above mentioned bond strength is relatively weak (physisorption and not chemisorption). Therefore, this bond can be disrupted by thermal energy available at disk file operating temperatures (generally 40 to 55 degrees centigrade).

Reversibility of the Langmuir process indicates that the disk's carbon layer would eventually lose its entire adsorbed organic film if pre-lubricated disks were placed in an unsealed, large container that was completely free of organic vapors (or if placed in a clean file with limited clean air flow).

In accordance with the present invention, such disks are placed into an environment where Langmuir kinetics are used to maintain the vapor pressure of the organic lubricant such that a film of that lubricant will be resident on the disk at the desired thickness. Thus, the disk's mono-molecular lubricating layer is maintained indefinitely (i.e. so long as the lubricant source is not totally consumed).

While the present invention is applicable to both a hermetically sealed disk file enclosure and a substantially sealed enclosure in which air flow induced through the enclosure is controlled, in preferred embodiments of the present invention, a partially sealed disk enclosure is provided (i.e. a disk file that allows a minimal amount of controlled airflow through the file). In these embodiments, a major portion of a stream of filtered air is induced to recirculate within the enclosure.

This air stream transports lubricant molecules to the disks, where Langmuir kinetics operate to cause the molecules to move between the air stream and the disk (i.e. pick up lubricant molecules from the disk, deposit molecules on the disk, or neither pickup nor deposit molecules) due to the above mentioned factors that are selected to produce a mono-molecular lubrication film on the disk, and due to the affinity of the disk's recording surface for molecules of organic material.

In a first embodiment of the present invention, the lubricant source is in bulk form, for example a pure crystalline or pure liquid form or mixtures thereof, and the rate of vaporization from this source is controlled by ensuring that the source is placed at a cool, or preferably the coolest location within the disk file. In this first embodiment of the invention, vapor pressure control of the lubricant source insures that the disks' mono-molecular lubricant layer is maintained only by operation of Langmuir kinetics.

When the lubricant source is at the coolest location in the disk file, vapors are transferred between the disk surface and the air stream only by operation of Langmuir kinetics, and the lubricant vapors do not appreciably condense on other components within the disk file, as by distillative or sublimative transfer.

In the first embodiment of the invention, a kinetic balance is maintained between the supply of lubricant and the surfaces of the disks, whereby the temperature of the supply of lubricant is maintained in the range of from about 0.5 to 7.0 degrees centigrade cooler than the disk surface upon which the mono-molecular lubricant layer is to be maintained. This thermal temperature differential establishes a relationship between the vapor pressure of the lubricant supply and the disks' lubricant layer, such that Langmuir kinetics operate to maintain the lubricant film in its mono-molecular state. This mono-molecular layer is maintained on the disks virtually independent of the operating temperature of the disk file over a range of from room temperature to about 70° centigrade. Below room temperature, the system is still expected to be operational, but the rate constants are so dramatically reduced that the monomolecular lubricant film becomes sufficiently stable without a reservoir source.

In a second embodiment of the invention, the lubricant source includes a mass of granular carrier particles, each grain of which is coated with a mono-molecular lubricant layer. The mass of granular carrier has a very large total surface area, as compared to the surface area of the disks. The granular carrier is comprised of a material that also has an affinity for organic molecules, for example, the granules are formed from the same carbon that is used to coat the disks. This large granular surface area is coated with a mono-molecular layer of lubricant, to about the same thickness as the lubricant film on the disk.

In the construction and arrangement of this second embodiment, lubricant molecules transfer between the disk file's air stream and both the source and the disks by operation of Langmuir kinetics. This results from the fact that the carbon granules are coated with the same mono-molecular layer of lubricant as are the disks.

In a third embodiment of the invention, the lubricant's vapor pressure is controlled by combining the lubricant with a diluent that has a much lower vapor pressure than does the lubricant. This provides a bulk mixture whose vapor pressure is substantially identical to the vapor pressure of the disks' mono-molecular layer of lubricant.

These and other features of the present invention will be apparent from the following description of the preferred embodiments thereof.

The Invention

FIG. 1 will be used to explain operation of all embodiments of the invention based upon the theory of Langmuir kinetics. Curve 12 is known as a Langmuir isotherm for physisorption and is shown for stearic acid and a carbon-coated disk at a temperature of 25° centigrade and at ambient atmospheric pressure. Curve 13 is a similar Langmuir isotherm but for a disk temperature of 50° centigrade.

In this figure, curve 10 represents the variation in the thickness of a mono-molecular Langmuir layer established on the surface of a disk over the preferred region of operation as a function of (1) the vapor pressure of the lubricant source supplied by the reservoir, divided by (2) the vapor pressure of the bulk lubricating material maintained at the temperature of the disk's mono-molecular layer (i.e. in a form that does not not have the physical characteristics of a mono-molecular film). The "1" value on the figure's X-axis is the point at which approach to this value from the left side will theoretically provide 100% surface coverage by a mono-molecular layer. For the lubricant stearic acid, a mono-molecular film thickness of about 7 angstroms will prevail at 25° centigrade, which is in general determined by (1) the physical size of such a molecule, and (2) the orientation in which the molecule adsorbs onto the surface of the carbon coated disk.

Portion 11 of this curve is the calculated Lagmuir isotherm extrapolated from data at a low pressure regime of the curve (e.g.; N less than 0.5 on the x-axis), while portion 12 represents the actual curve that was obtained from experimental data at room temperature (25° centigrade). From inspection of FIG. 1, it can be seen that the extrapolated curve 11 is always concave downward and has a maximum thickness t, which is less than the maximum value t' measured in curve 12. This difference between the maxima for the extrapolated curve and the measured curve is seen to become greater with increasing temperature (cf.; curves 11, 12 and 13). As it will become clear in a later discussion, the maximum lubricant film depicted in region 17 of FIG. 1 is determined by the intersection of thickness t and, in this case, the isotherm given by curve 13; region 17 is the preferred range of thicknesses for the reservoir system in this example of stearic acid and the assumed maximum file temperature of 50° centigrade (curve 13 isotherm).

In region 14, the vapor pressure established by the lubricant source is greater than the vapor pressure of the lubricant in bulk form at the temperature of the disk, which results in the bulk transport of lubricant molecules from the source to the disks via the air stream (i.e.; reservoir source warmer than the disk's surfaces). In accordance with the invention, this condition must be avoided, since the disk lubricant layer cannot be controlled via vapor pressure to achieve a mono-molecular condition, and the lubricant layer can become too thick.

Operation in region 14 is undesirable for a number of reasons. For example, contamination of the disk file's heads by lubricant may occur, so as to cause the head's aerodynamic features to be unfavorably altered on which the flying of the head is dependent. When this occurs, the head may fly too low or it may even crash into the disk. In addition, the head may stick to the disk in its rest position (i.e. a condition known as stiction), such that it is difficult to provide enough rotational power to break the head loose when an attempt is subsequently made to start operation of the disk file.

Region 15 is also to be avoided, since, while this is a region where Langmuir control of the lubricant film by vapor pressure is possible (as compared to uncontrolled region 14), there are certain conditions where the Langmuir film may tend to become thicker and to ultimately take on the properties of a bulk lubricant (for example, crystals of stearic acid can be formed), at least when the disk's temperature decreases rapidly. This undesirable phenomenon is shown by transition line 18, which represents a relatively quick temperature drop. In this case, a transition from the thicker, high-temperature Langmuir isotherm 13 to the thinner, low-temperature Langmuir isotherm 12 can produce a residue of excessive lubricant on the surface of the disk (such as crystals of stearic acid). This residue has the physical properties of the bulk lubricant, which can easily form if operation occurs in region 14. The mechanical properties of excessive lubricant present in bulk form are undesirable and very different than the properties of the lubricant in the form of a mono-molecular film described in the present invention.

Region 16 also is to be avoided for the practical reason that while the lubricant layer is mono-molecular and controllable, as desired, coverage of the disk surface by the lubricant may be too sparse to provide adequate disk-to-head lubrication.

Region 17 is the preferred operating region of the present invention. In this region the lubricant layer is mono-molecular, and the surface of the disk is adequately covered with a sufficient lubricant film to provide good lubrication. The lubricant film thickness is easily controlled in this region and it is little affected by changes in temperature.

Figure 2:
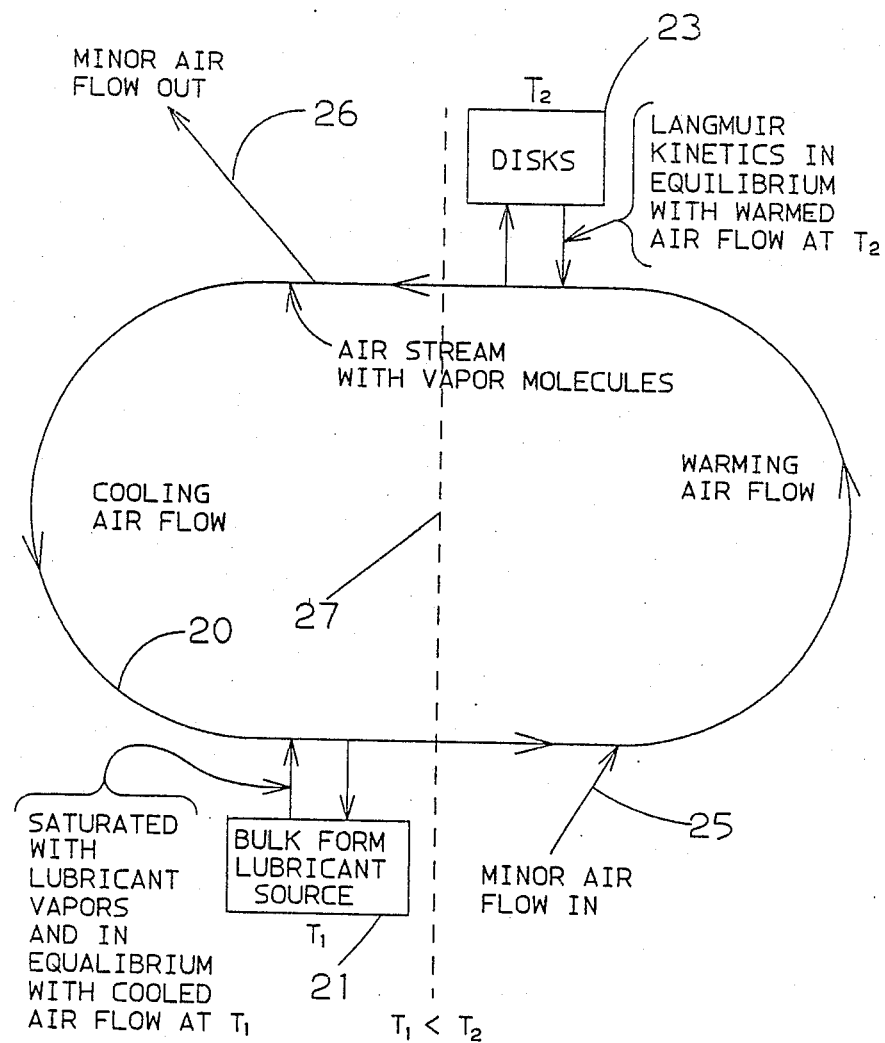
FIG. 2 is a showing of a first embodiment of the invention wherein the vapor pressure of the source of lubricant is controlled by maintaining the temperature of the lubricant reservoir lower than the temperature of the disks.
Figure 3:
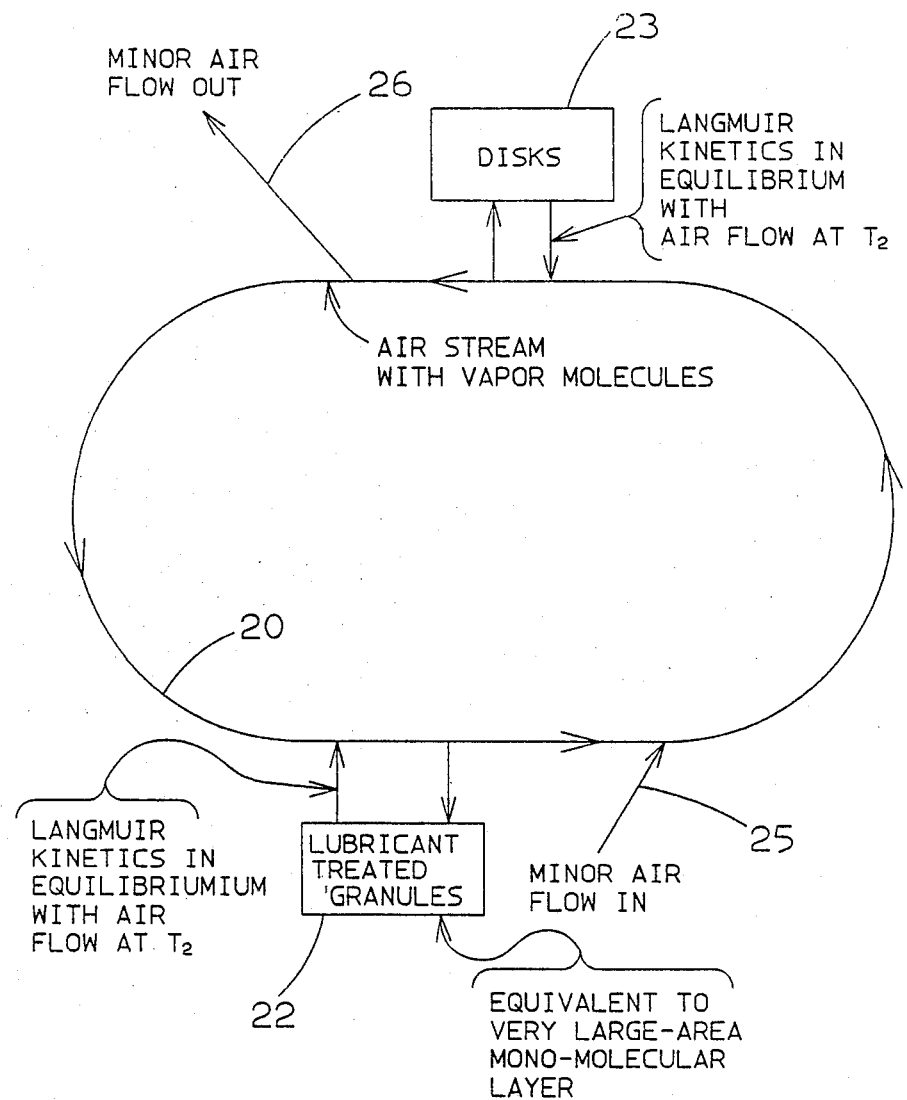
FIG. 3 is a showing of a second embodiment of the invention wherein the vapor pressure of the source of lubricant is controlled by using carbon granules having a very large surface area that is covered with a mono-molecular layer of the lubricant.
Figure 4:
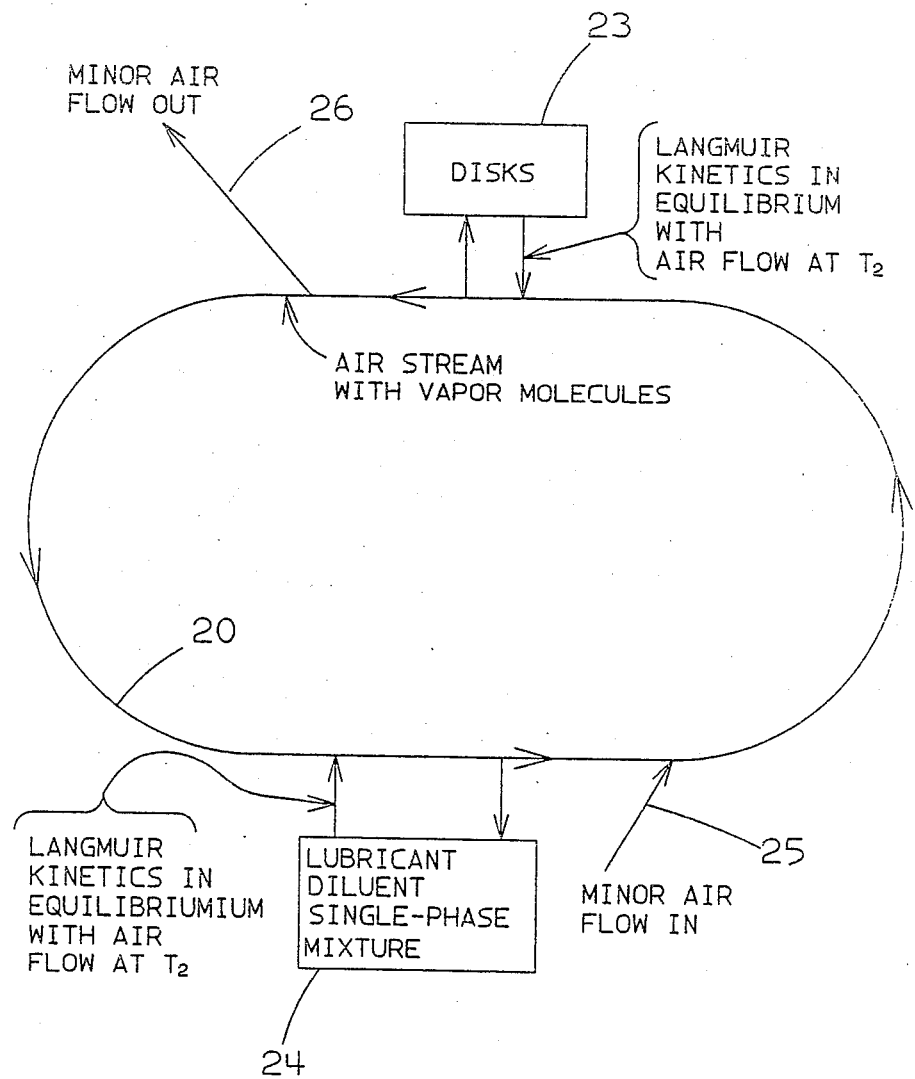
FIG. 4 is a showing of a third embodiment of the invention wherein the vapor pressure of the source of lubricant is controlled by mixing the lubricant with a diluent of very low vapor pressure, thereby producing a single phase mixture whose bulk-form vapor pressure is about equal to the vapor pressure of a mono-molecular layer of the lubricant per se.

FIGS. 2, 3 and 4 show three embodiments of the invention. These figures show the invention in a broad manner and are useful in understanding the broad concept of the invention. In these figures, like disk file components and characteristics are identified by like numbers.

In these three embodiments, disks 23 (for example, a stack of eight rigid magnetic recording disks of about 13 centimeter diameter) each includes a recording surface having high surface energy and an affinity for organic lubricant molecules (for example, a sputtered carbon overcoat layer on a layer of magnetic material). In addition, the source of lubricant in each of these three embodiments comprise an organic lubricant(s).

FIG. 2 is an embodiment of the invention using temperature differential to achieve vapor pressure control of organic lubricant source 21. The lubricant source is in bulk form (i.e. its vapor pressure characteristic is that of a solid or a liquid).

FIG. 3 is an embodiment of the invention wherein the lubricant source 22 comprises a mass of granular carrier particles having a very large surface area relative to the surface area of disks 23. Each granule of source 22 is coated with a mono-molecular layer of organic lubricant. Thus, in this embodiment the vapor pressure of the lubricant source is controlled by ensuring that substantially similar Langmuir conditions exist at both the lubricant source and at disks 23.

FIG. 4 is an embodiment of the invention wherein bulk source of lubricant 24 comprises a single phase mixture of a lubricant and a diluent. This diluent is of much lower vapor pressure than is the lubricant (i.e. ideally a diluent of zero vapor pressure would be used). the vapor pressure of bulk source 24 is thus controlled (i.e. lowered) to be substantially the same as the vapor pressure of the mono-molecular lubricant layer at disks 23. Thus, in this embodiment the vapor pressure of the lubricant source is controlled (as in the embodiment of FIG. 3) by ensuring that substantially similar Langmuir conditions exist at both the lubricant source and the disks.

Unlike the embodiments of FIGS. 2 and 3, operation of the FIG. 4 embodiment is not always independent of temperature.

Reference numeral 20 in FIGS. 2-4 represents the stream of recirculating air that flows within the disk file's enclosure. In an exemplary disk file, this air stream comprised about 1200 cubic centimeters per minute. Only a portion of the disk file's internal air stream flows over the lubricant source or reservoir (with the exception of the FIG. 3 embodiment, wherein substantially all of the air stream flows through source 22, as will be explained). For example, about 1/7th of the file's internal air flow may pass over the lubricant source to pick up lubricant molecules.

In accordance with the invention, in FIGS. 2-4 the lubricant vapor molecules pass over the recording surface of all disks. In so doing, a Langmuir thin film of lubricant molecules is dynamically maintained on the disks, as (1) lubricant molecules are given up to the disk surface, (2) lubricant molecules are given up to the air stream, or (3) neither of these actions takes place, all in accordance with the operation of Langmuir kinetics at the disk surface. This condition is indicated by the two symbolic arrows that are placed at the interface of air stream 20 and disks 23, and by the figure legend that indicates that a condition of Langmuir kinetics at (or very near to) equilibrium exists at this interface.

While the disk file's enclosure or housing (not shown) is a substantially closed enclosure, it is known that a small volume of air leakage exists. This air leakage is symbolically indicated by arrows 25 and 26. Typically, this leakage amounts to less than 0.1 percent of the volume of air stream 20.

As can be appreciated, the lubricant source of the present invention is gradually consumed by a combination of three effects, namely (1) by maintenance of a mono-molecular lubricant film on disks 23, (2) by air leakage 26 out of the disk file's enclosure, and (3) by chemical combination and/or vapor condensation with or on other components within the disk file.

In FIG. 2, the interface of lubricant source 21 and air stream 20 is saturated with lubricant vapors at the temperature of the source. The source's temperature is indicated as being the value $T_1$, whereas the temperature of disks 23 is indicated as being the value $T_2$. In accordance with this embodiment of the invention, temperature $T_1$ must be lower than temperature $T_2$. In order to prevent excessive lubricant deposits forming on the disk due to cooling of the file, it is preferable that temperature $T_1$ be significantly cooler than temperature $T_2$ in the disk file. For example, if stearic acid is used as the lubricant, the temperature $T_1$ must be at least 0.5° centigrade less than temperature $T_2$ in order to operate in region 17 of FIG. 1, thereby avoiding region 15.

Since lubricant source 21 is at a temperature $T_1$ that is lower than the temperature $T_2$ of the disks, in accordance with the theory of Langmuir kinetics, a mono-molecular film of lubricant is maintained on the surface of disks 23. As previously stated, it is desirable that lubricant source 21 be mounted at the coolest temperature location within the disk file in order to ensure that lubricant vapors do not condense on other components within the disk file.

In this embodiment of the invention, a broken line 27 divides the disk file into two areas. The area to the right of line 27 is the area in which air stream 20 is warming, and the area to the left of line 27 is the area in which the air stream is cooling.

With reference to FIG. 3, lubricant source 22 comprises a mass of lubricant-carrier granules whose effective surface has been treated with a mono-molecular layer of lubricant. Preferably these granules are carbon granules comprising the same type of carbon that forms the overcoat on disks 23. It is essential to this embodiment of the invention that (1) the surface area of the granules be much, much larger than the surface area of disks 23, and (2) the granules must be treated so as to exhibit the effect of a mono-molecular vapor pressure which is substantially identical to the vapor pressure of the mono-molecular lubricant film at disks 23. For example, the granules and the disks are both coated with a mono-molecular layer of the lubricant. In reference to FIG. 1, the granules can be treated so as to effectively lubricate the disks at the midpoint of the preferred region 17.

In an exemplary embodiment, three grams of activated carbon granules having a total surface area of about 2100 square meters were mixed with enough lubricant to provide an effective mono-molecular layer of lubricant on each granule. This total granule surface area of about 2,100 square meters compared to a total surface area of 0.19 square meters for disks 23, i.e.; about a 11,000 to 1 difference in surface area for eight 130 mm disks.

Because the surface area of activated carbon is derived from an internal, convoluted structure, it is not clear that this material has an actual monolayer of lubricant when the conditioned granules effectively establish and maintain a monolayer-film on the surfaces of the disks. Another plausible explanation for this effect is that the "conditioned" activated carbon operates as a myriad of very small capillaries appropriately filled with either liquid or solid lubricant, so as to exhibit a concave surface as viewed from the vapor phase. This curature would result in a suppression of the vapor pressure of these curved lubricant surfaces as compared to that of the bulk lubricant. Therefore, any material that exhibits a multitude of properly sized fissures can be treated with the appropriate amount of lubricant to result in a reduced vapor pressure, so long as the lubricant wets the selected substrate and the fissures are of the proper size.

As can be appreciated, since the recording surface of disks 23 (FIGS. 2-4) have an affinity for organic molecules, the surface does not selectively acquire only organic lubricant molecules. It is possible that other components within the disk file may give off organic molecules during the life of the disk file, even though the components have preferably been processed by procedures to minimize organic outgassing and the like. In addition, unknown organic molecules may be carried into the disk file enclosure by air leakage 25. These miscellaneous organic molecules may deposit on the surface of disks 23, in competition with the lubricant, and sometimes produces an undesirable, or at least an unanticipated effect.

The embodiment of FIG. 3 is constructed and arranged to minimize the effect produced by the presence of any such organic molecules of unknown origin. More specifically, as will be shown relative to FIG. 9, the embodiment of FIG. 3 provides for substantially all of air stream 20 to first pass through source 22 (for convenience, the showing of air stream 20 in FIG. 3 does not make this clear). Air stream 20 then moves on to disks 23. In so doing, the large surface area of the granules, which also have an affinity for organic molecules, share the organic molecules of unknown origin with disks 23 in the proportion of the area of the granules to the area of the disks. In other words, for every molecule of this unknown origin that deposits on a disk, about 1,300 such molecules deposit on the granules. This construction and arrangement substantially eliminates the effects of these organic molecules on operation of disks 23 during the lifetime of the disk file.

In the embodiment of the invention shown in FIG. 4, vapor pressure control of bulk lubricant source 24 is achieved by diluting the bulk vapor pressure of the lubricant per se. This is done by forming a single phase, bulk-form mixture of the lubricant (for example, stearic acid) with a diluent that has a very low vapor pressure as compared to the vapor pressure of the pure lubricant. The result is a lubricant source 24 whose partial vapor pressure approximates or equals the vapor pressure of the Langmuir mono-molecular lubricant film at disks 23. Thus, as in the case of FIG. 3, the interface of air stream 20 to the lubricant source is supplying vapors represented as equivalent to Langmuir kinetics at equilibrium.

Whatever form the invention takes, it must be assumed that the lubricant material will be consumed at a very slow rate. For example, lubricant vapors are carried away if the disk file is constructed and arranged to provide for air flow through the file enclosure. Also, a so-called sealed disk file usually has a small amount of air leakage. Another example of consumption of the lubricant is chemical combination with the various metal members within the disk file enclosure. This loss-channel should be included with the losses denoted by 22 in FIGS. 2-4. It is important that the losses 22 be made small relative to the supply capabilities of the source (e.g.; 21, 22 and 24 in FIGS. 2, 3 and 4 respectively).

In accordance with the invention, the various factors which provide the desired mono-molecular Langmuir lubricating film on the disks are balanced so that consumption of the bulk of the lubricating material occurs at a rate that will supply the required vapor pressure at the disk surface being lubricated, generally for the life of the disk file.

Figure 5:
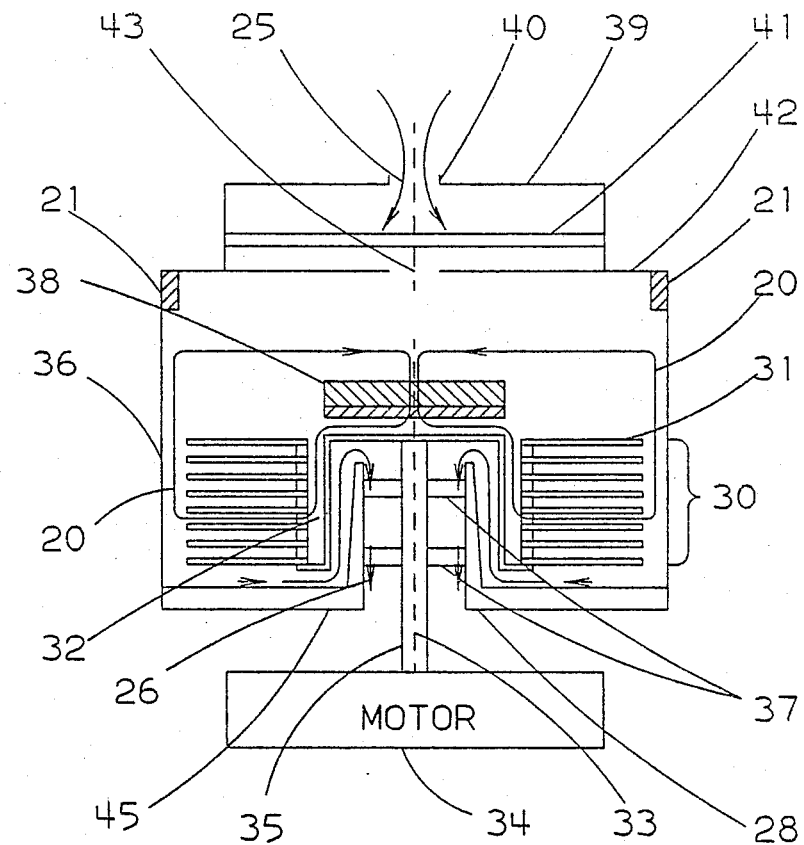
FIGS. 5 and 6 are another showing of the first embodiment of the invention.

FIG. 5 is a schematic view of a rigid disk file containing the first embodiment of the invention. Disk files of this type are well known to those skilled in the art. For this reason, this figure shows only simplified basic components of the file. For example, the magnetic read/write head assembly that cooperates with the vertical stack 30 of magnetic recording disks 31, or the details of construction of spindle assembly 32 that supports the disks for rotation about a vertical axis 33, are not shown.

A vertical stack of eight individual disks is shown. However, within the teachings of the invention, any number of disks, including a single disk, may be provided, and the disk(s) may be changeable or not, as those skilled in the art may wish.

In a preferred embodiment of the invention, the disks are of the thin-film type, and they contain a sputtered carbon overcoat. A characteristic of this overcoat is that the carbon coating has an affinity for organic molecules. Thus, organic lubricant vapor will deposit on, and be adsorbed by, the carbon coating. However, overcoats other than sputtered carbon also have been found to perform equally well with this lubricant system, where silicon sputtered in an oxygen-rich plasma is an example.

As is conventional, spindle 32 is driven at a constant rotational speed by motor 34 and by way of spindle shaft 35.

Disks 31 are contained within enclosure or housing 36. This housing is substantially sealed. Within the teachings of this invention, housing 36 may be a hermetically sealed housing.

Housing 36 and motor 34 are stationary, and they are mounted to and carried by a frame member, not shown. Rotation of shaft 35, relative stationary housing 36, is accommodated by well known spindle bearings 37.

Rotation of spindle assembly 32 and disks 30 on axis 33 establishes a low pressure zone internal of the housing. This zone is generally coaxial and aligned with axis 33.

It is the practice in the disk file art to place a recirculation air filter 38 in this low pressure zone, for example a paper filter such as HEPA (i.e. a random weave fiberglass fabric in a latex binder, and having a polyester outer coating). Thus, the air stream that recirculates within enclosure 36 is mechanically filtered.

Air stream paths 20 of FIG. 5 are similar to the stream 20 above mentioned relative to FIGS. 2-4. The upper portion of these two air streams cooperate with the two lubricant sources 21, also described relative to FIG. 2.

While FIG. 5 shows a version of the invention's first embodiment, if the recirculation filter 38 were modified to provide FIG. 3's mass of treated granules at the location of filter 38, the arrangement would easily be converted to a version of the invention's second embodiment.

A preferred means of constructing a disk file such as is schematically shown in FIG. 5 is to pretreat disks 30 with the chosen lubricant at the desired mono-molecular thickness, and to then install the disks into the organically-clean disk file in which they will operate. Another method is to install unlubricated disks in the disk file, and then store the file until such time as lubricant vapors have migrated to the disks, to establish the required mono-molecular film of lubricant thereon.

The housing of FIG. 5 is constructed and arranged to accommodate air leakage 25–26 shown in FIGS. 2–4. A compartment 39 contains a relatively small orifice or diffusion tube 40. A condition of low pressure is created within tee housing along 33 due to rotation of the disks, which causes leakage air 25 to flow from the ambient air surrounding the housing into compartment 39. All of this leakage air passes through an activated charcoal filter 41. Use of filter 41 is preferred when disks 30 are thin-film disks. The function of filter 41 is to mechanically filter dust and the like from the air, and more particularly to filter organic material of unknown origin from the air as it enters housing 36. This filter chamber is connected to the file chamer via another small orifice or diffusion tube 43, which is similar to 40.

Lubricant material 21 is strategically located within housing 36 to take advantage of natural thermal gradients that exist within the file, thereby establishing the necessary conditions expressed in conjunction with FIG. 1. The location and design of the reservoir means that lubricating material 21 precludes bulk transfer of lubricant material to the disk surfaces. That is, lubricating material 21 is placed at a relatively cool location, and preferably at the coolest location within housing 36. In the event that the supply of lubricant must be further cooled, a thermal heat pipe or a thermoelectric device can be used to transfer heat away from material 21.

The method of holding or containing lubricating material 21 depends upon the physical state of the material. Either a solid or a liquid lubricating material can be applied to a high quality fabric, such as a fabric that is suitable for clean room use. A solid lubricating material can be cast in sheet form. An open cell plastic matrix, or a sintered, nonreactive metal structure can be used to hold a quantity of the lubricating material in its bulk form.

While the invention is not to be limited to a specific organic lubricant material, in a preferred embodiment, the lubricant was a carboxylic acid, for example a saturated fatty acid of which palmitic acid and stearic acid are examples. By way of a further example, most commercial stearic acids are about 45% palmitic acid, about 50% stearic acid and about 5% saturated carboxylic acids of similar molecular weight.

Ideally, the various mechanisms (not shown) within housing 36 should not "getter" the lubricant vapor out of air stream 20. At the very least, virtually none of the lubricant vapor should be removed from the air stream by such mechanisms, since in accordance with the invention, the lubricant vapors in this air stream are deposited as a mono-molecular Langmuir film of lubricant on the recording surface of the disks, and these vapors are always required to support this film.

Figure 6:
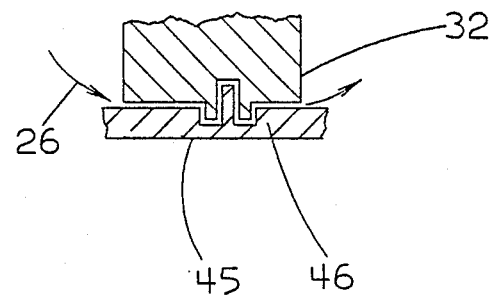

Leakage air 26 exits compartment 36 by way of an annular seal means 45. FIG. 6 is an enlarged view of the bottom portion of annular cup-shaped spindle 32 on which the disks are mounted. This enlarged view shows use of an annular labyrinth seal that is formed with the housing's stationary bottom wall 46. Leakage air 26 passes through bearings 37, and returns to the ambient air surrounding the disk file.

When the disk file is inactive, that is when the disks are not spinning, the above described leakage air flow 25–26 does not generally occur. Due to the placement of the orifice or diffusion tube 43, there is very little tendency for lubricant vapors to migrate into and thus be absorbed by filter 41 during the file's inactive periods. This effect would not be detrimental to the file, however it would place a load on filter 41.

Orifice 40 also reduces the loading of filter 41 when the disk file is inactive in that very little of the external air surrounding the housing will enter orifice 40 in the absence of the spinning of disks 30.

Figure 7:
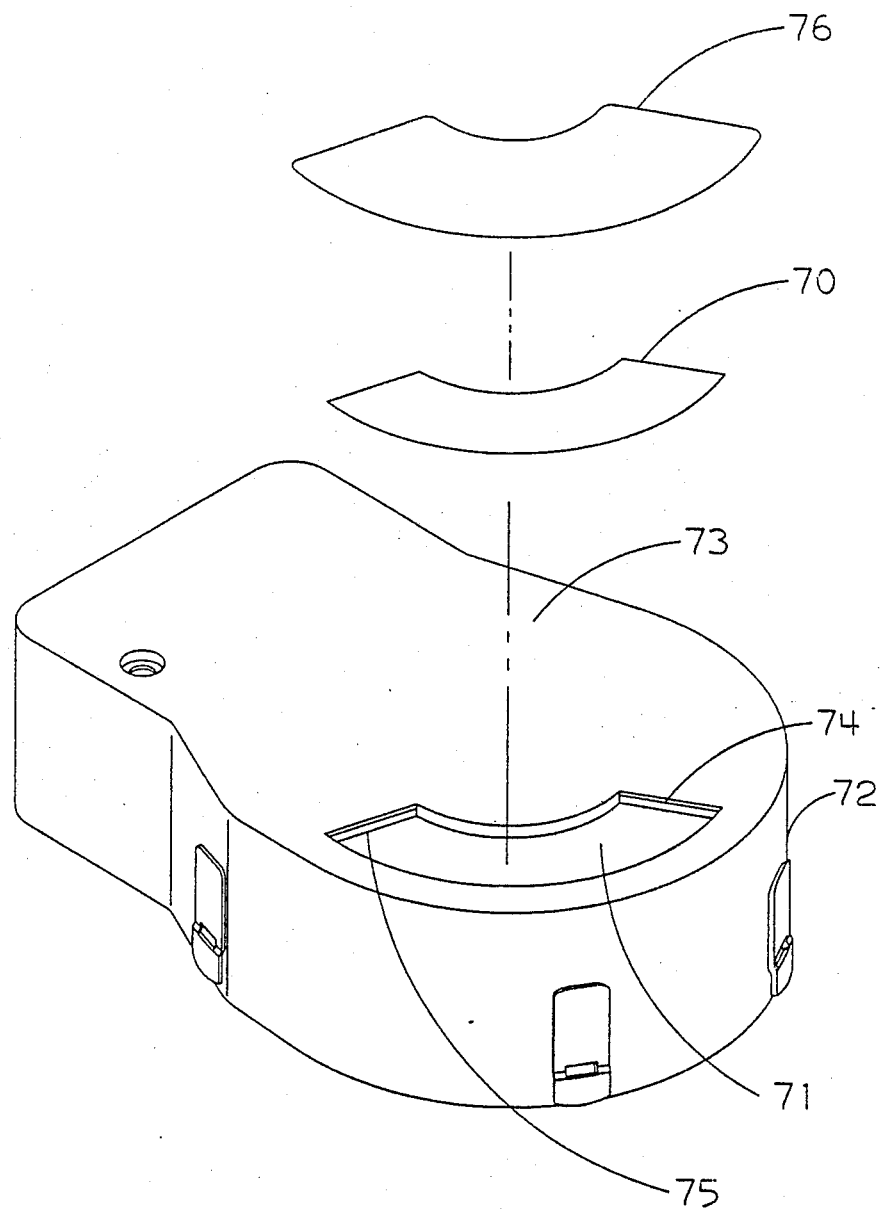
FIGS. 7 and 8 are another showing of the first embodiment of the invention (FIG. 8 is an enlarged view showing reservoir detail)
Figure 8:
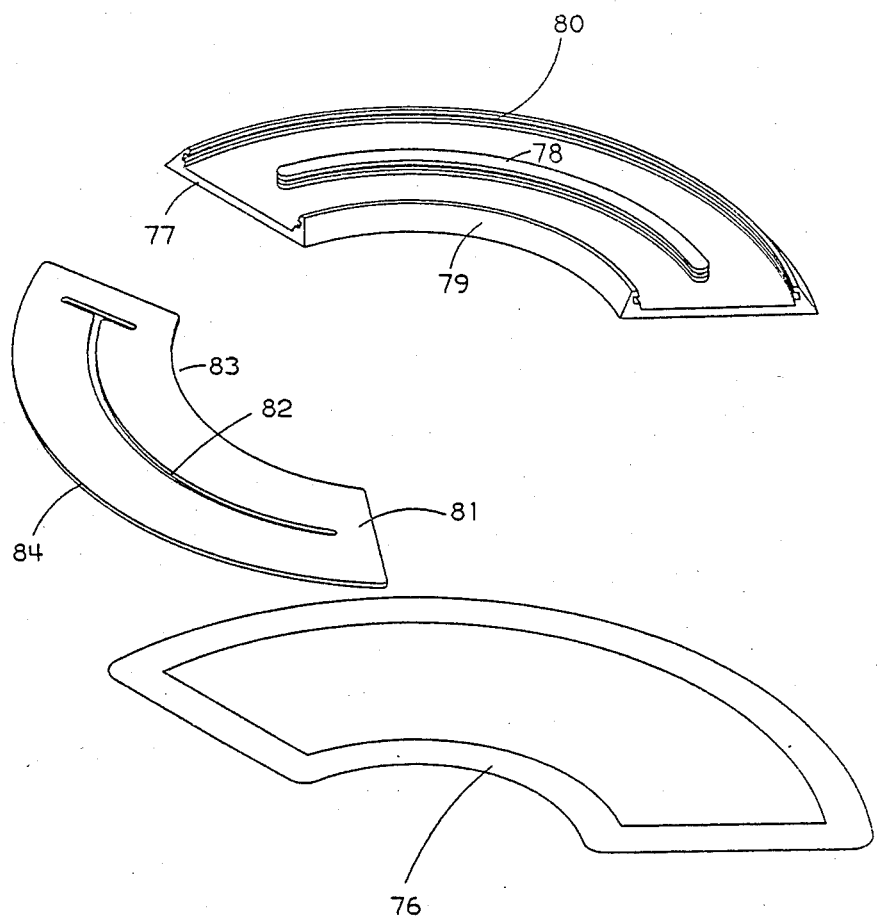

FIGS. 7 and 8 show another version of this invention's first embodiment, wherein the lubricant (i.e. source 21 of FIG. 2) is contained in an arcuate member 70 that is held in an area 71 formed in the top cover 72 of the disk file (not shown). Details of construction of source member 70 are best seen in the enlarged and exploded bottom view of FIG. 8.

Cover 72 is preferably formed of black aluminum, so as to provide a cool mounting location for the lubricant source. The cover's top planar surface 73 is provided with an arcuate recessed area 71 that is open to the underside of the cover at its two end slots 74 and 75. The spinning disks, located directly under the cover, operate to induct air flow out of slot 75, for example.

Lubricant source 70 fits within area 71, and an adhesive tape member 76 is used to seal source 70 within this cover area. In order to protect source 70 from sources of external heat, tape member 76 is preferably aluminized on its outer surface.

As will be apparent, the air stream entering slot 75 passes through source member 70 and reenters the disk file by way of slot 74.

With reference to FIG. 8, source member 70 comprises a Teflonbase member 77 having a center wall 78 and a pair of outside walls 79 and 80. The lubricant reservoir comprises a thin flexible ribbon member 81. Member 81 is, for example, formed of fiberglass, for example HEPA, that has been impregnated with the selected lubricant. The amount of lubricant contained in the fiberglass should not be excessive, since the lubricant should not flow out of the fiberglass if the lubricant is heated to above its melting point. The lubricant is contained in the fiberglass in its bulk form, for example in its crystalline form. This is done, for example, by heating stearic acid to above its melting point, and then placing a predetermined number of drops of the heated, liquid lubricant on member 81.

\*\*Trademark of E. I. DuPont de Nemours

Member 81 includes a central slot 82 and side edges 83 and 84. The portions 82–84 of member 81 engage slots formed in the portions 78–80 of base member 77, and serve to mount the lubricant source on the base member.

When the device is assembled as shown in FIG. 7, arcuate air channels exist along both surfaces of source member 81.

Figure 9:
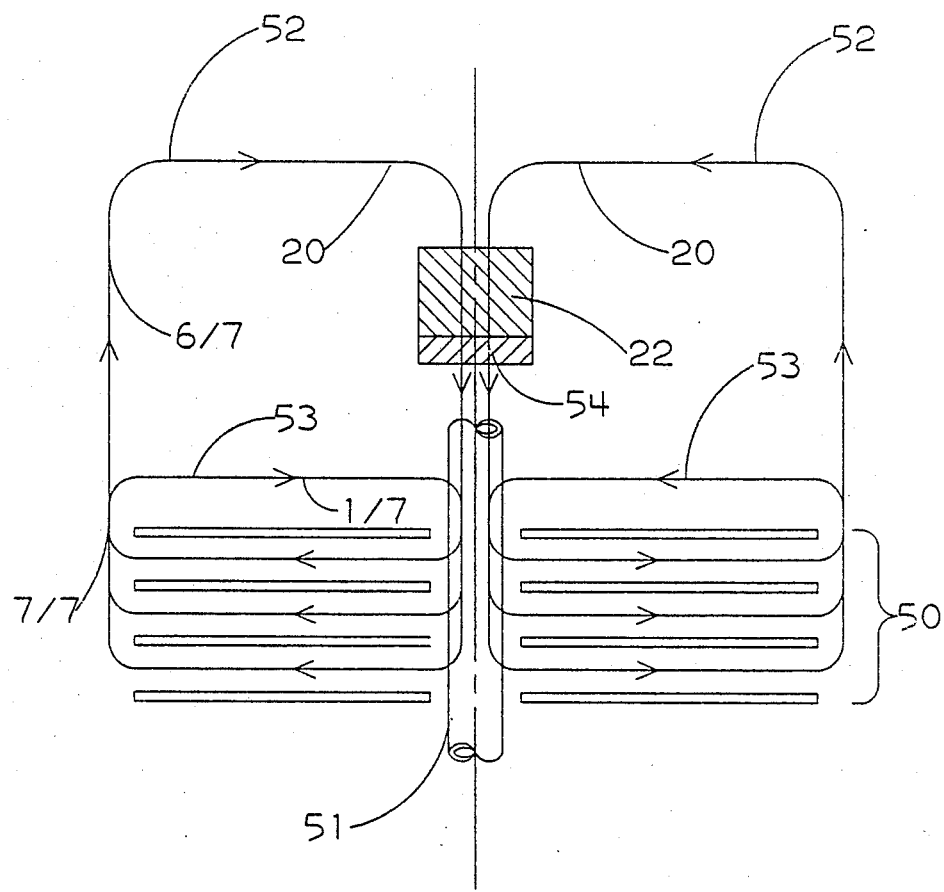
FIG. 9 is another showing of the second embodiment of the invention.

FIG. 9 shows a version of the invention's second embodiment, i.e. the embodiment above discussed relative FIG. 3. In FIG. 9 a major portion of the disk file is not shown. A stack of disks 50 are supported for rotation on hollow spindle 51. Spinning of these disks induces air flow streams 20, similar to air stream 20 of FIG. 3.

In FIG. 9 the air stream has been divided into its various components. That is, portion 52 comprises about 6/7ths of the disk file's total recirculating internal air flow. A portion 53 is represented as the portion of the air stream that leaks around recirculation filter 54.

This portion comprises about 1/7th of the recirculating air stream.

Reference numeral 22 is the source of lubricant, comprising lubricant-treated granules of carbon, similar to source 22 above described in detail relative to FIG. 3.

As stated previously, one of the advantages of this invention embodiment is that since source 22 comprises a very, very large surface area covered with a mono-molecular layer of lubricant, this large surface area operates to scavenge the major portion of unknown organic molecules from air stream 20, before this air stream reaches disks 50.

In practice, air stream 20, filter 54 and source 22 are contained in an organically clean air-flow duct (not shown).

While this invention has been particularly described with reference to preferred embodiments thereof, it will be understood by those skilled in the art that various changes in detail may be made therein without departing from the spirit and scope of this invention.

What is claimed is:

1. A method for maintaining a mono-molecular layer of an organic lubricant on a recording surface, comprising:
    providing a magnetic recording surface having an affinity for organic lubricant molecules,
    coating said recording surface with a mono-molecular layer of an organic lubricant,
    mounting said recording surface in container that is at least partially closed,
    inducing an airflow stream within said container,
    mounting a supply of an organic lubricant within said container and in said air stream at a location that is spaced from said recording surface, and
    controlling the vapor pressure of said lubricant supply so as to establish a condition whereby said air stream (1) picks up lubricant molecules, (2) receives lubricant molecules, or (3) neither picks up nor receives lubricant molecules, from said lubricant supply and/or said recording surface, as is required to maintain said mono-molecular lubricant layer on said recording surface.

2. The method of claim 1 wherein said recording surface is a magnetic recording disk, and wherein said airflow stream is induced by rotation of said disk.

3. The method of claim 1 wherein said step of controlling the vapor pressure of said lubricant source comprises:
    providing a cool temperature at said lubricant supply, relative said recording surface, to insure that said mono-molecular lubricant layer is maintained on said recording surface by operation of substantially equilibrium Langmuir kinetics, and that lubricant molecules do not transfer from said air stream to said recording surface by the process of condensation or the like.

4. The method of claim 3 wherein said recording surface is a magnetic recording disk, and wherein said airflow stream is induced by rotation of said disk.

5. The method of claim 4 wherein the temperature of said lubricant is at least 0.5° centigrade cooler than the temperature of said recording surface.

6. The method of claim 5 wherein said mono-molecular lubricant layer is in the range of about 3 to 15 angstroms thick.

7. The method of claim 6 wherein said recording surface includes a carbon-containing overcoat layer.

8. The method of claim 1 wherein said step of controlling the vapor pressure of said lubricant source comprises:
    providing a mass of granular carrier particles of very large surface area relative the area of said recording surface, said particles having an affinity for lubricant molecules, and
    treating said carrier particles with said lubricant having an effective vapor pressure substantially identical to that of said mono-molecular layer on said recording surface,
    to thereby insure that said mono-molecular lubricant layer is maintained on said recording surface by operation of Langmuir kinetics.

9. The method of claim 8 wherein said recording surface is a magnetic recording disk, and wherein said airflow stream is induced by rotation of said disk.

10. The method of claim 9 wherein the effective surface area of said carrier particles is at least 1000 times greater than the surface area of said recording surface.

11. The method of claim 10 wherein said mono-molecular lubricant layer is in the range of about 3 to 15 angstroms thick.

12. The method of claim 11 wherein said recording surface includes a carbon-containing overcoat layer, and wherein said granular particles are formed of a carbon-containing material.

13. The method of claim 1 wherein the vapor pressure of said supply of lubricant is controlled by
    combining said lubricant with a diluent having a lower vapor pressure than said lubricant, to thereby produce a mixture whose bulk vapor pressure is substantially the same as the vapor pressure of a mono-molecular layer of said lubricant, to thereby insure that said mono-molecular lubricant layer is maintained on said recording surface by operation of Langmuir kinetics.

14. The method of claim 13 wherein said recording surface is a magnetic recording disk, and wherein said airflow stream is induced by rotation of said disk.

15. The method of claim 14 wherein said recording surface includes a carbon-containing overcoat layer.

16. The method of claim 15 wherein said mono-molecular lubricant layer is in the range of about 3 to 15 angstroms thick.

17. Magnetic recording apparatus, comprising
    magnetic recording media means including recording surface means having an affinity for organic molecules,
    means for inducing flow of an air stream to said recording surface means,
    a supply of a vaporizable organic lubricant material in said air stream at a location that is spaced from said recording surface means, and
    means ensuring that the operating temperature of said lubricant supply is lower than the operating temperature of said recording surface means,
    such that vaporization of said lubricant occurs in a manner to effect vapor transfer of said lubricant, by operation of Langmuir kinetics, from said supply to said recording surface means in order to maintain a mono-molecular lubricant layer on said recording surface means.

18. The apparatus of claim 17 wherein said vapor transfer provides a lubricant layer in the range of about 3 to 15 angstroms thick on said recording surface means.

19. The apparatus of claim 17 wherein said magnetic media means comprises a magnetic recording disk having a carbon overcoat.

20. The apparatus of claim 19 wherein said vapor transfer provides a lubricant layer in the range of about 3 to 15 angstroms thick on said carbon overcoat.

21. The apparatus of claim 17 wherein said magnetic media means comprises a disk file including a plurality of magnetic recording disks, and wherein flow of said air stream is induced by rotation of said disks.

22. The apparatus of claim 21 wherein said disks include a recording surface comprises a magnetic recording layer and an carbon containing overcoat.

23. The apparatus of claim 22 wherein said vapor transfer provides a very thin lubricant layer in the range of about 3 to 15 angstroms thick on said carbon overcoat.

24. Magnetic recording apparatus, comprising
magnetic recording media means including recording surface means having an affinity for organic molecules, said recording surface having thereon a mono-molecular layer of a vaporizable organic lubricant,
means for inducing flow of an air stream to said recording surface means,
bulk lubricant means in said air stream at a location that is spaced from said recording surface means, said bulk lubricant means comprising a single phase mixture of
said vaporizable organic lubricant, and
a diluent having a vapor pressure that is lower than the vapor pressure of said lubricant,
said bulk lubricant means having a vapor pressure that is lower than the vapor pressure of said organic lubricant,
to thereby provide a vapor pressure for said bulk lubricant means that is substantially the same as the vapor pressure of said mono-molecular layer on said recording surface,
such that vaporization of said bulk lubricant means occurs in a manner to effect vapor transfer of said lubricant from said bulk lubricant means to said recording surface means in order to maintain said mono-molecular lubricant layer on said recording surface means.

25. The apparatus of claim 24 wherein said vapor transfer provides a lubricant layer in the range of about 3 to 15 angstroms thick on said recording surface means.

26. The apparatus of claim 24 wherein said recording surface means comprises a magnetic recording layer having a carbon overcoat.

27. The apparatus of claim 24 wherein said vapor transfer provides a lubricant layer in the range of about 3 to 15 angstroms thick on said carbon overcoat.

28. The apparatus of claim 24 wherein said magnetic recording media means comprises a disk file including a plurality of magnetic recording disks, and wherein flow of said air stream is induced by rotation of said disks.

29. The apparatus of claim 28 wherein said disks include a recording surface comprises a magnetic recording layer and an carbon containing overcoat.

30. The apparatus of claim 29 wherein said vapor transfer provides a very thin lubricant layer in the range of about 3 to 15 angstroms thick on said carbon overcoat.

31. Magnetic recording apparatus, comprising
magnetic recording media means including a recording surface having an affinity for organic molecules,
a mono-molecular layer of an organic lubricant on said recording surface,
means for inducing flow of an air stream to said recording surface means,
organic lubricant supply means in said air stream at a location that is spaced from said recording surface means, said lubricant supply means comprising
a mass of granules having a total surface area at least 1000 times greater than the surface area of said recording surface, and
a mono-molecular layer of said organic lubricant covering the surface area of said granules,
such that vaporization of said lubricant layer on said granules occurs in a manner to effect vapor transfer of said lubricant, by operation of Langmuir kinetics, from said granules to said recording surface in order to maintain said mono-molecular lubricant layer on said recording surface.

32. The apparatus of claim 31 wherein said vapor transfer provides a lubricant layer in the range of about 3 to 15 angstroms thick on said recording surface.

33. The apparatus of claim 31 wherein said magnetic media means comprises a magnetic recording disk having a carbon overcoat, and wherein said granules are carbon granules.

34. The apparatus of claim 33 wherein said vapor transfer provides a lubricant layer in the range of about 3 to 15 angstroms thick on said carbon overcoat.

35. The apparatus of claim 31 wherein said magnetic media means comprises a disk file including one or more magnetic recording disks, and wherein flow of said air stream is induced by rotation of said disk.

36. The apparatus of claim 35 wherein said disks include a recording surface comprises a magnetic recording layer and a carbon containing overcoat, and wherein said granules are carbon containing granules.

37. The apparatus of claim 36 wherein said vapor transfer provides a layer in the range of about 3 to 15 angstroms thick on said carbon overcoat.

38. The method of claim 8 wherein the treating of said carrier particles comprises coating said carrier particles with a thin layer of said lubricant.

39. The method of claim 8 wherein the treating of said carrier particles comprises filling porosity within said particles with said lubricant.

* * * * *